(12) United States Patent
Hordos

(10) Patent No.: US 9,046,327 B2
(45) Date of Patent: Jun. 2, 2015

(54) GAS GENERATOR

(75) Inventor: Deborah L. Hordos, Troy, MI (US)

(73) Assignee: TK Holdings Inc., Armada, MI (US)

( * ) Notice: Subject to any disclaimer, the term of this patent is extended or adjusted under 35 U.S.C. 154(b) by 1526 days.

(21) Appl. No.: 12/286,430

(22) Filed: Sep. 29, 2008

(65) Prior Publication Data

US 2009/0102171 A1 Apr. 23, 2009

Related U.S. Application Data

(63) Continuation-in-part of application No. 11/395,477, filed on Mar. 30, 2006, now abandoned.

(60) Provisional application No. 60/666,695, filed on Mar. 31, 2005.

(51) Int. Cl.
*F42B 3/04* (2006.01)
*B60R 21/264* (2006.01)
*F42B 3/24* (2006.01)
*B60R 21/26* (2011.01)
*B60R 21/263* (2011.01)

(52) U.S. Cl.
CPC ............... *F42B 3/04* (2013.01); *B60R 21/2644* (2013.01); *B60R 2021/26011* (2013.01); *B60R 2021/2633* (2013.01); *B60R 2021/2648* (2013.01); *F42B 3/24* (2013.01)

(58) Field of Classification Search
CPC ......... F42B 3/04; F42B 3/24; B60R 21/2644; B60R 2021/2648; B60R 2021/26011; B60R 2021/2633
USPC ........................................................ 280/741
See application file for complete search history.

(56) References Cited

U.S. PATENT DOCUMENTS

| | | | |
|---|---|---|---|
| 2,985,979 A | 5/1961 | Doyle et al. | 42/96 |
| 3,111,899 A | 11/1963 | Tiedemann | 102/342 |
| 3,558,285 A | 1/1971 | Ciccone et al. | 422/165 |
| 3,711,115 A | 1/1973 | Lohr | 280/736 |
| 3,785,149 A | 1/1974 | Timmerman | 60/205 |
| 3,787,010 A | 1/1974 | Meranshian et al. | 244/146 |

(Continued)

FOREIGN PATENT DOCUMENTS

| | | | | |
|---|---|---|---|---|
| DE | 199 50 311 A1 | 10/1999 | | A61K 1/00 |
| WO | WO 97/29151 | 8/1997 | | C08K 3/00 |

OTHER PUBLICATIONS

Office Action U.S. Appl. No. 11/479,493, filed Jun. 30, 2006, Mailed on Feb. 3, 2009.

(Continued)

*Primary Examiner* — Paul N Dickson
(74) *Attorney, Agent, or Firm* — L.C. Begin & Associates, PLLC.

(57) ABSTRACT

A gas generator is provided, the gas generator having a propellant cushion that prevents movement of propellant tablets or grains by providing a bias thereagainst. Furthermore, the cushion is formed from a desiccating material thereby removing moisture and inhibiting moisture uptake by the propellant during manufacture of the gas generator. The elastomeric cushion is also able to manage the presence of chlorine-containing products during periods of inactivation of the gas generator. Accordingly, variables such as fractured propellant and/or moisture retained within the propellant are mitigated or eliminated, thereby enhancing repeatability of inflator performance.

10 Claims, 2 Drawing Sheets

(56) References Cited

U.S. PATENT DOCUMENTS

| | | | | |
|---|---|---|---|---|
| 3,849,923 | A | 11/1974 | Hawkins | 42/96 |
| 3,862,866 | A | 1/1975 | Timmerman et al. | 149/21 |
| 3,880,595 | A | 4/1975 | Timmerman et al. | 23/281 |
| 3,902,934 | A | 9/1975 | Timmerman | 149/83 |
| 4,244,295 | A | 1/1981 | Shaffer | 102/205 |
| 4,301,732 | A | 11/1981 | Van Sickle | 102/430 |
| 4,337,352 | A | 6/1982 | Naymann | 562/401 |
| 5,221,765 | A | 6/1993 | Patil et al. | 562/401 |
| 5,518,054 | A | 5/1996 | Mitson et al. | 149/35 |
| 5,538,568 | A | 7/1996 | Taylor et al. | 149/70 |
| 5,670,740 | A | 9/1997 | Barnes et al. | 149/62 |
| 5,682,014 | A | 10/1997 | Highsmith et al. | 149/36 |
| 5,763,821 | A | 6/1998 | Wheatly | 149/19.5 |
| 5,861,571 | A | 1/1999 | Scheffee et al. | 102/288 |
| 6,077,371 | A | 6/2000 | Lundstrom et al. | 149/37 |
| 6,464,254 | B2 | 10/2002 | Chikaraishi et al. | 280/741 |
| 6,517,647 | B1 | 2/2003 | Yamato | 149/45 |
| 6,588,797 | B1 | 7/2003 | Blomquist | 280/741 |
| 6,682,616 | B1 | 1/2004 | Yamato et al. | 149/45 |
| 6,752,421 | B2 | 6/2004 | Khandhadia et al. | 280/741 |
| 6,779,812 | B2 | 8/2004 | Ishida et al. | 280/741 |
| 6,800,154 | B1 | 10/2004 | Carey et al. | 149/2 |
| 7,005,459 | B2 | 2/2006 | Hekal | 523/102 |
| 7,134,690 | B2 | 11/2006 | Furusawa et al. | 280/736 |
| 2006/0220362 | A1 | 10/2006 | Hordos | 280/736 |
| 2007/0084532 | A1 | 4/2007 | Burns et al. | 149/24 |
| 2007/0113940 | A1 | 5/2007 | Burns et al. | 149/75 |
| 2009/0008003 | A1 | 1/2009 | Burns et al. | 149/46 |

OTHER PUBLICATIONS

Office Action U.S. Appl. No. 11/479,493, filed Jun. 30, 2006, Mailed on Apr. 13, 2010.

Office Action U.S. Appl. No. 11/479,493, filed Jun. 30, 2006, Mailed on Aug. 4, 2009.

Office Action U.S. Appl. No. 11/395,477; filed Mar. 30, 2006; Mailed Aug. 23, 2006.

Office Action U.S. Appl. No. 11/395,477; filed Mar. 30, 2006; Mailed Feb. 14, 2007.

Office Action U.S. Appl. No. 11/395,477; filed Mar. 30, 2006; Mailed Sep. 13, 2007.

Office Action U.S. Appl. No. 11/395,477; filed Mar. 30, 2006; Mailed Mar. 27, 2008.

Office Action U.S. Appl. No. 11/479,493; filed Jun. 30, 2006; Mailed Dec. 11, 2008.

Office Action U.S. Appl. No. 11/479,493, filed Jun. 30, 2006, Mailed Sep. 2, 2011.

Office Action U.S. Appl. No. 12/217,327, filed Jul. 2, 2008, Dated Nov. 10, 2010.

Office Action U.S. Appl. No. 12/497,493, filed Jun. 30, 2006, Dated Sep. 30, 2010.

GAS GENERATOR

CROSS-REFERENCE TO RELATED APPLICATIONS

The present application claims the benefit of U.S. Application Ser. No. 60/666,695 having a filing date of Mar. 31, 2005. The present application is a co-owned continuation-in-part application of U.S. application Ser. No. 11/395,477 having a filing date of Mar. 30, 2006, (abandoned on Sep. 29, 2008), and claims the benefit thereof.

TECHNICAL FIELD

The present invention relates generally to pyrotechnic gas generators for inflatable restraint devices, and more particularly to such a gas generator having a propellant cushion for biasing a resistance against the propellant bed to prevent fracture of propellant grains and/or tablets therein.

BACKGROUND OF THE INVENTION

Inflatable restraint systems or "airbag" systems have become a standard feature in many new vehicles. These systems have made significant contributions to automobile safety; however, as with the addition of any standard feature, they increase the cost, manufacturing complexity and weight of most vehicles. Technological advances addressing these concerns are therefore welcomed by the industry. In particular, the gas generator or inflator used in many occupant restraint systems tends to be the heaviest, most complex component. Thus, simplifying the design and manufacturing of airbag inflators, while retaining optimal function, has long been a goal of automotive engineers.

Typical inflators are constructed having an elongate metallic body. Because many inflators utilize pyrotechnic gas generant compounds to produce inflation gas for the associated airbag, the inflator structure is necessarily robust, making such inflators correspondingly heavy. An increasingly popular and useful inflator style uses multiple, selectively activated gas generant charges. In such systems, the multiple propellant beds disposed within the inflator body may be ignited either simultaneously or serially. Certain vehicle and occupant parameters may justify firing both propellant beds in the event of a crash. Other scenarios may be best addressed by firing only one of the propellant charges, or firing the charges sequentially, with a delay between the two events. In order to avoid sympathetic ignition of one charge during firing of the other, the combustion chambers must generally be fluidly isolated. The relatively large forces on the inflator generated by the combustion of pyrotechnics therein requires the internal partitions and other structural members of the inflator that fluidly isolate the charges to be relatively sturdy, further adding to the weight of the inflator.

Various schemes have developed for constructing sturdy, internally partitioned multi-chamber inflators. One approach involves inserting a partition into the interior of the inflator, then crimping or roll-forming the inflator body to retain the partition. This approach has proven effective; however, in many circumstances a heavier-duty/thicker inflator body must be used that will withstand the crimping and/or roll forming process. Such inflator bodies can be quite heavy, and the manufacturing process is relatively complicated given processing steps necessary to secure the internal partitions.

Yet another concern is repeatability of performance of the gas generator. Propellant springs or cushions are employed to prevent fracture of the propellant thereby maintaining a relatively constant propellant surface area of combustion. Additionally, certain propellants may be hygroscopic wherein the absorption of humidity and/or water may inhibit expected burn characteristics and therefore may result in performance variability of an associated airbag cushion during a crash event. Even though useful in preventing the fracture of propellant, propellant springs or cushions add to the manufacturing complexity and cost, and to the weight of the overall inflator.

Certain gas generating compositions or auto-ignition compositions contain constituents that contain chlorine, such as potassium perchlorate or potassium chlorate. These oxidizers may liberate chlorine-containing products over extended periods of time that are typically managed by constituents contained within each composition, such as clay or calcium oxide. The concern with utilizing clay or calcium oxide is that the relative amount of solids released after inflator activation is increased as compared to compositions that do not contain metal-containing constituents. It would be an improvement in the art to manage chlorine-containing products residing within the inflator without the use of metal-containing constituents in the respective composition, thereby increasing the relative mols of gas produced per gram of gas generant while continuing to manage the chlorine-containing products to optimize the performance of the inflator.

U.S. Pat. No. 6,779,812 to Ishida et al. describes an inflator containing silicone cushioning members made from silicon rubber and silicon foam. Ishida fails to recognize the problem of absorption of chlorine-containing products. In particular, Cole-Parmer® recognizes the general incompatibility of chlorine-containing products and silicone because of degradation of the silicone. Accordingly, in the presence of chlorine-containing products, silicon-based products are subject to chemical degradation thereby detracting from their cushioning ability in an inflator for example. See the chemical resistance charts of Cole-Parmer® on the web. Accordingly, Ishida fails to recognize the general incompatibility of silicon-containing cushions within a gas generator containing chlorine-containing products. In automotive gas generators, the shelf-life of the gas generator must meet customer specification and safety requirements. As such, vibration control relative to the propellant and management of the chlorine-containing decomposition products is desirable, while yet minimizing the metal-containing constituents in the various compositions.

WO 97/29151 to Frampton describes various pharmaceutical stoppers for capping vials of pharmaceutical products. The stoppers are made of elastomeric materials containing a desiccant. Frampton does not recognize the problem of chlorine-containing products affecting degradation of an elastomeric or silicone-based stopper.

SUMMARY OF THE INVENTION

It is an object of the present invention to provide a gas generator having a propellant cushion that prevents movement of the propellant tablets or grains by providing a bias thereagainst. Furthermore, the cushion is formed from a desiccating material thereby removing moisture and inhibiting moisture uptake by the propellant both during manufacture, and during its normal shelf-life within a vehicle interior. In yet another advantage, gas generators containing "smokeless" or minimal metal-containing auto-ignition or gas generating compositions typically contain perchlorate-based or chlorate-based constituents. The present invention permits the use of silicon-based or silicone-based cushions, or more generally elastomeric cushions, within the gas generator without degradation in the presence of chlorine-containing products. As a result, management of the chlorine-containing products using clay or other metal-containing constituents within the various compositions is not necessary, thereby resulting in filtration and performance improvements.

In accordance with the foregoing and other objects of the invention, an exemplary inflator having a lightweight propellant cushion formed from a desiccating material within an inflatable restraint system, is provided. An exemplary inflator preferably includes an elongate inflator body having a first and a second end and a plurality of inflation apertures. The inflator body defines a first combustion chamber wherein a first propellant charge is positioned. A partitioning assembly is nested within the inflator body, and positioned proximate the second end, the partitioning assembly defining a second combustion chamber wherein a second propellant charge is positioned. The exemplary inflator further includes a first and a second initiator, the initiators operably associated with the first and second propellant charges, respectively. The initiators are selectively operable to ignite the propellant charges, thereby supplying an inflation gas via the first chamber to an inflatable restraint cushion.

DETAILED DESCRIPTION OF PREFERRED EMBODIMENTS

Figure 1:
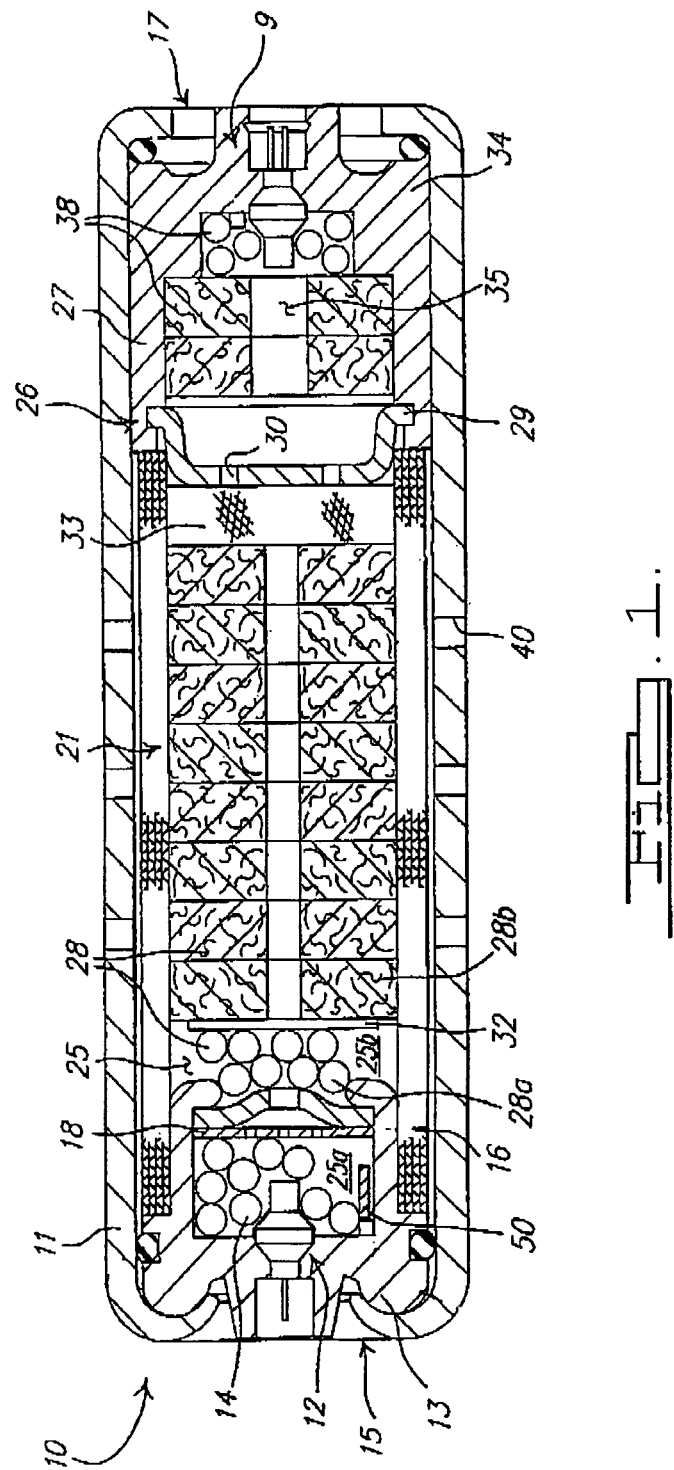
FIG. 1 is a partial side view of an inflator according to a preferred constructed embodiment of the present invention.

Referring to FIG. 1, there is shown an exemplary gas generator or inflator 10 according to an embodiment of the present invention. Inflator 10 is designed for use with an inflatable restraint system in an automobile, supplying inflation gas for inflation of a conventional airbag cushion, a function well known in the art. Inflator 10 utilizes two propellant charges, described herein, that are ignited in separate combustion chambers, and discharge inflation gas via a common plenum 21. Exemplary inflator 10 further provides independently operable initiators for igniting the respective propellant charges, imparting significant variation to the available operating schemes for the inflator. For instance, both sequential and serial firing of the two charges is possible, depending on the optimal deployment of the associated airbag. It is contemplated that inflator 10 will find greatest utility in passenger-side airbag systems; however, other applications are possible without departing from the scope of the present invention. All the components of the present invention are formed from known materials that are readily available commercially, and are made by known processes.

Inflator 10 includes an elongate pressure vessel or inflator body 11, preferably a hollow steel cylinder. Inflator body 11 is characterized by a first end 15 and a second end 17, and defines a plurality of inflation apertures 40 that allow fluid communication between the exterior of the inflator body and plenum 21. A first end closure 13 is positioned at first end 15 of inflator body 11, preferably creating a fluid seal therewith. A second end closure 34 is preferably positioned at second end 17, also preferably creating a fluid seal with inflator body 11. Closures 13 and 34 are preferably metallic; however, they might be made from another suitable material such as a plastic, a ceramic, or a composite material. First end 15 and second end 17 are preferably crimped inwardly to hold first and second closures 13 and 34 in place; however, some other suitable method such as welding or mating threads on inflator body 11 and the respective closures might be used. In addition, rubber O-rings may be snap-fit around closures 13 and 34, creating or enhancing seals with inflator body 11.

Inflator 10 includes a first combustion chamber 25, within which a quantity of gas generant material or first propellant charge 28 is placed. In a preferred embodiment, chamber 25 comprises a significant proportion of the interior of inflator body 11, defined in part by longitudinal walls of inflator body 11, and in part by first end closure 13. Plenum 21 is the region of inflator body 11 whereby inflation gas is passed to apertures 40. Thus, chamber 25 and plenum 21 are at least partially coextensive. Stated another way, plenum 21 may be loosely defined as the portion of chamber 25 that occupies the middle region of the interior of inflator body 11. The phrase "at least partially coextensive" should be understood to include designs wherein chamber 25 is subdivided by foils, burst shims, etc., as described herein, as well as designs wherein chamber 25 is uninterrupted by such features. First end closure 13 preferably includes a cylindrical extension 16 wherein a perforated disk 18 is positioned, separating chamber 25 into two sub-chambers 25a and 25b. An initiator assembly 12, preferably including a conventional igniter or squib, is positioned at first end 15, and preferably mounted in first end closure 13 such that it can ignite compositions in chamber 25. A second initiator assembly 9, also preferably including a conventional igniter or squib, is positioned at second end 17.

Propellant charge 28 may be any suitable gas generant composition known in the art, preferably a non-azide composition containing phase stabilized ammonium nitrate. Other gas generating compositions or auto-ignition compositions contained within the gas generator may contain perchlorate and chlorate containing oxidizers as known in the art. Exemplary, but not limiting formulations are described in U.S. Pat. Nos. 5,872,329, 5,756,929, and 5,386,775, and are herein incorporated by reference. In a preferred embodiment, propellant charge 28 is provided in both tablet 28a and wafer 28b forms, both of which are illustrated in FIG. 1. The tablets 28a and wafers 28b may be different compositions, but are preferably the same material in different, commercially available forms. In a preferred embodiment, a retainer disk 32 separates tablets 28a from wafers 28b. Disk 32 may be made from a relatively porous material such that a flame front or heat from ignition of tablets 28a can ignite wafers 28b, or it may be made from a known material that allows ignition of wafers 28b by heat convection from the burning of tablets 28a. A quantity of booster propellant 14 is preferably placed in sub-chamber 25a, and is ignitable via initiator 12 in a conventional manner to ignite and enhance the burn characteristics of the first propellant charge 28a and 28b.

In accordance with the present invention, a cushion 33 is positioned between propellant tablets 28b and a cap 29, thereby inhibiting fracture of the tablets 28b. In further accordance of the present invention, the cushion 33 is formed from a composition containing silicone and a desiccating material such as synthetic zeolites or molecular sieves, calcium oxide, and/or calcium sulfate. The composition of cushion 33 has a silicone to desiccating material ratio ranging from 10/90 to 90/10, and more preferably has a silicone to desiccating material ratio ranging from 20/80 to 50/50. It will be appreciated that cushion 33 may also be positioned anywhere within the inflator 10, and may provide a resilient support wherever required therein. Accordingly, the shape of the cushion 33 is not limited to the exemplary structure shown. In yet another advantage, the cushion also absorbs other undesirable gases thereby improving the quality of the gaseous effluent upon gas generator activation. Another advantage is that the adsorption of the desiccant is slowed by being mixed within the silicone matrix, thereby preventing excess adsorption of moisture during the assembly of the gas generator. Yet another advantage is that the adsorption of undesirable gases mitigates the likelihood of auto-catalyzed decomposition of the "smokeless" main gas generant due to excess buildup of chlorine-containing products, for example. In still a further advantage, the cushion is made from a lightweight material rather than a typical wire mesh material, thereby reducing the overall weight of the gas generator 10 or gas generating system 10 associated therewith.

FTIR analysis confirms the efficacy of molecular sieve in absorbing chlorine-containing products. It has been unexpectedly discovered that the incorporation of the desiccant within the cushion 33 inhibits degradation of an elastomeric cushion, or a silicon-based cushion, in the presence of chlorine-containing products, thereby enhancing gas generator performance. The elastomeric cushion is thus able to manage the presence of chlorine-containing products during periods of inactivation of the gas generator, notwithstanding the general incompatibility of the elastomer or silicon in the presence of chlorine-containing products. A preferred gas generator includes a gas generating composition, a chlorine-containing auto-ignition composition, and a cushion 33, the cushion 33 includes a silicon-based or silicone-based elastomer containing molecular sieve, manufactured as described below. In yet another embodiment, the gas generating composition and the chlorine-containing auto-ignition composition may be the same composition.

The cushion 33 may be formed by mixing a desired amount of the desiccant, synthetic zeolite for example, provided by companies such as Johnson Matthey identified at jmgpt on the web or Grace Davison identified at gracedavison on the web, into a desired amount of uncured silicone. In one embodiment, the gas generant retainer 33 may be formed from silicone and zeolite, the silicone and zeolite in weight percent ratio of 10/90 to 90/10 of silicone to zeolite. In et another embodiment, the gas generant retainer 33 may be formed from silicone and zeolite, the silicone and zeolite provided in weight percent ratios of 20/80 to silicone to zeolite. Other desiccants may be provided by known suppliers such as Aldrich or Fischer. Zeolite has been found to be particularly desirable in view of favorable results with regard to heat aging for 400 hours at 107 C. The silicone may then be finally mixed to a substantially homogeneous mixture, and cured according to manufacturer instructions. Silicone is readily available and may for example be provided by companies such as Shin-Etsu of Japan.

A partitioning assembly 26 is positioned proximate second end 17, and preferably comprises a substantially cylindrical base member 27 and a cap 29. Base member 27 and cap 29 define a second combustion chamber 35, that at least partially encases a second quantity of propellant 38, preferably in both tablet and wafer form. Base member 27 and second end closure 34 may be the same piece, as in one preferred embodiment, or a plurality of separate, attached pieces might be used. In a preferred embodiment, partitioning assembly 26 is formed structurally independent from inflator body 11. Partitioning assembly 26 is an independent piece having no physical attachment with the longitudinal sidewall of inflator body 11. During assembly of inflator 10, partitioning assembly 26 is slid into position in inflator body 11, and second end 17 is crimped inwardly to secure assembly 26 therein. Thus, other than securing second end closure 34, no modifications are made to inflator body 11 to accommodate or otherwise secure the components defining second combustion chamber 35.

Cap 29 preferably includes a plurality of apertures 30 that can connect second chamber 35 with plenum 21 (as well as first chamber 25, since plenum 21 and chamber 25 are fluidly connected and partially coextensive). In a preferred embodiment, a foil or burst shim (not shown) is placed across apertures 30 to block fluid communications between the two chambers. It should be appreciated, however, that the foil or burst shim is positioned and/or manufactured such that it will not burst inwardly, i.e. in the direction of second end 17 during combustion of propellant in chamber 25. Combustion of propellant in second chamber 35, on the other hand, is capable of bursting the foil or shim outwardly, allowing the combustion products in chamber 35 to escape to plenum 21/first chamber 25, and thereby discharge from inflator body 11. The preferred foils and shims, and the described methods of mounting them are all known in the art. By fluidly isolating first and second chambers 25 and 35, sympathetic ignition of the propellant in chamber 35 during combustion of the propellant in chamber 25 can be avoided, as described herein. The outer diameter of base member 27 is preferably substantially equal to the inner diameter of inflator body 11, such that base member 27 is nested therein, i.e. fits relatively snugly. Because both second end closure 34 and inflator body 11 are preferably substantially cylindrical, the two components are preferably axially aligned. One or more autoignition tablets 50 may be placed in inflator 10, allowing ignition of the gas generant materials upon external heating in a manner well known in the art.

In one embodiment, wafers 28b are positioned in a stack in plenum 21. Again, the cushion 33, is positioned adjacent the stack 28b, and biases the entire stack 28b toward first end 15. Wafers 28b, in turn, preferably bias disk 32 against tablets 28a, preventing tablets 28a from being jostled while the inflator is idle for long periods, helping avoid mechanical degradation of tablets 28a.

The inflator 10 described herein may be altered in design depending on application requirements. Nevertheless, the cushion or propellant restraint 33, in accordance with the present invention is provided in any inflator design, and biased against at least one propellant thereby providing a cushioning effect as formally realized by metallic cushions for example.

In a typical inflatable restraint system design, inflator 10 is connected to an electrical activation system that includes a crash sensor, of which there are many well-known suitable types. In addition, various sensing systems may be incorporated into the vehicle electronics, including seat weight sensors, occupant detection systems, etc. During a typical deployment scenario, an impact or a sudden vehicle deceleration, an activation signal is sent from an onboard vehicle computer to inflator 10. The signal may be sent to either or both of the initiator assemblies housed with inflator 10. Because chamber 25 preferably contains the larger, main charge, the activation signal is typically directed initially to the initiator assembly operably associated with first chamber 25. In certain scenarios, for example with larger occupants, or where occupants are out of a normal seated position in the vehicle, it may be desirable to activate both propellant charges simultaneously. Other scenarios may call for different activation schemes. For instance, certain conditions may make it desirable to fire only the first propellant charge, or sequentially fire both charges, with varying time delays between the two events. Once an electrical activation signal is sent to the initiator associated with first chamber 25, combustion of booster propellant 14 in sub-chamber 25a is initiated. The flame front and/or hot combustion gases from booster 14 subsequently traverse disk 18, initiating combustion of propellant tablets 28a in chamber 25b. The burning of tablets 28a produces inflation gas that flows rapidly out inflation apertures 40, initiating filling of an associated airbag. A cylindrical, metallic mesh filter 16 is preferably positioned in inflator body 11, and filters slag produced by the combustion of the compounds therein, also serving as a heat sink to reduce the temperature of the inflation gas. Combustion of tablets 28a initiates combustion of wafers 28b, preferably made from the same or similar material as tablets 28a, providing a sustained burn that delivers a relatively constant supply of gas to the associated airbag via plenum 21 and apertures 40. When desired, an electrical activation signal is sent to the initiator operably associated with second chamber 35, containing a gas generant composition 38 that is preferably similar to the composition in chamber 25. Rapid creation of gas in chamber 35 causes a rapid rise in the gas pressure therein, outwardly bursting the foil or shim (not shown) that covers apertures 30, in cap 29. The gas is subsequently discharged from inflator 10 via plenum 21 and apertures 40. Activation of the gas generant in chamber 35 can take place before, during, or after an activation signal is sent to initiator assembly 12, operably associated with chamber 25.

Because both chambers 25 and 35 discharge inflation gas through plenum 21, the present invention provides different operating advantages over many earlier designs wherein separate plenums are used for each combustion chamber. By discharging inflation gases from both combustion chambers 25 and 35 through plenum 21, the inflation profile characteristics across the length and width of an associated airbag can be improved as compared to earlier multi-chamber designs wherein the combustion chambers discharge via separate plenums. In addition, the use of a partitioning assembly structurally independent from the inflator body sidewalls allows the inflator to be constructed without crimping or otherwise modifying the inflator body itself. Moreover, because inflator 10 utilizes a plenum that is coextensive with a first of the combustion chambers, inflator 10 has a simpler design than multi-chamber inflators utilizing combustion chambers that are both partitioned from a common plenum. Inflator body 11 utilizes no attached internal partitions, and can therefore be manufactured without the need for strengthening to compensate for weakening caused by partition attachment. These and other advantages reduce the cost, manufacturing complexity, size and weight of the inflator.

Figure 2:
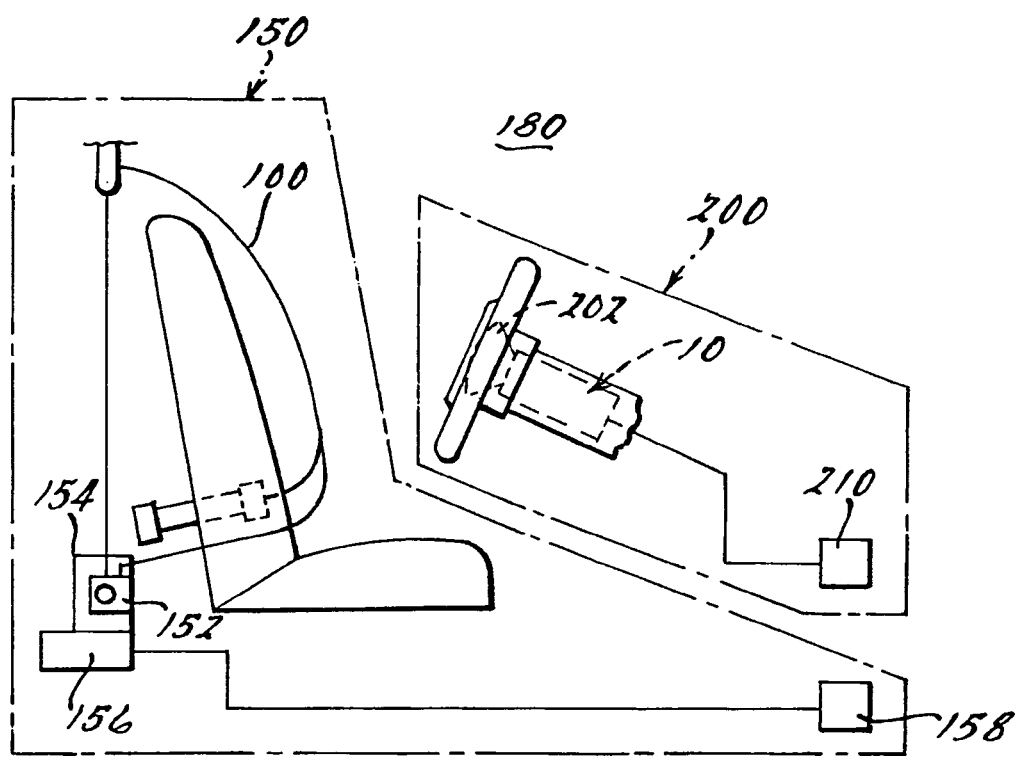
FIG. 2 is a schematic view of an exemplary gas generating system, a vehicle occupant protection system, in accordance with the present invention.

Referring now to FIG. 2, the exemplary inflator 10 described above may also be incorporated into an airbag system 200. Airbag system 200 includes at least one airbag 202 and an inflator 10 containing a gas generant composition 12 in accordance with the present invention, coupled to airbag 202 so as to enable fluid communication with an interior of the airbag. Airbag system 200 may also include (or be in communication with) a crash event sensor 210. Crash event sensor 210 includes a known crash sensor algorithm that signals actuation of airbag system 200 via, for example, activation of airbag inflator 10 in the event of a collision.

Referring again to FIG. 2, airbag system 200 may also be incorporated into a broader, more comprehensive vehicle occupant restraint system 180 including additional elements such as a safety belt assembly 150. FIG. 2 shows a schematic diagram of one exemplary embodiment of such a restraint system. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a safety belt pretensioner 156 containing propellant 12 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553, 803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It should be appreciated that safety belt assembly 150, airbag system 200, and more broadly, vehicle occupant protection system 180 exemplify but do not limit gas generating systems contemplated in accordance with the present invention.

The present description is for illustrative purposes only, and should not be construed to limit the breadth of the present invention in any way. Thus, those skilled in the art will appreciate that various modifications could be made to the presently disclosed embodiments without departing from the intended spirit and scope of the present invention. Other aspects, features and advantages will be apparent upon an examination of the attached drawing figures and appended claims.

What is claimed is:

1. A gas generator comprising:
   a housing having a first end and a second end;
   a chlorine-containing composition contained within said housing, ignitable upon activation of said gas generator; and
   an elastomeric retainer contained within said housing, said retainer comprised of a desiccating material.

2. A gas generating system comprising the gas generator of claim 1.

3. A vehicle occupant protection system incorporating the gas generator of claim 1.

4. The gas generator of claim 1 wherein said retainer is formed from silicone and the desiccating material.

5. The gas generator of claim 1 wherein said retainer is formed from silicone and the desiccating material selected from zeolites, calcium oxide, calcium sulfate, and mixtures thereof.

6. The gas generator of claim 1 wherein said retainer is formed from silicone and zeolite, said silicone and zeolite provided in weight percent ratios of 10/90 to 90/10 of silicone to zeolite.

7. The gas generator of claim 1 wherein said gas generant retainer is formed from silicone and zeolite, said silicone and zeolite provided in weight percent ratios of 20/80 to 50/50 of silicone to zeolite.

8. A gas generator comprising:
   a housing having a first end and a second end;
   a gas generating composition;
   a chlorine-containing composition contained within said housing; and a resilient cushion comprised of a silicon-based elastomer and molecular sieve, said cushion biased against said gas generating composition.

9. A gas generator comprising:

a housing having a first end and a second end;

a gas generant contained within said housing, ignitable upon activation of said gas generator; and a gas generant retainer comprised of an elastomer and a desiccant, said retainer in physical contact with said gas generant for absorbing moisture contained within the housing prior to combustion of the gas generant.

10. The gas generator of claim 9 wherein said retainer is comprised of silicone and molecular sieve.

\* \* \* \* \*

UNITED STATES PATENT AND TRADEMARK OFFICE
CERTIFICATE OF CORRECTION

PATENT NO. : 9,046,327 B2
APPLICATION NO. : 12/286430
DATED : June 2, 2015
INVENTOR(S) : Hordos It is certified that error appears in the above-identified patent and that said Letters Patent is hereby corrected as shown below:

In the Specification

Column 5; Line 39;   Please insert --provided-- after the second occurrence of zeolite.

Column 5; Line 40;   Please delete "et" and insert --yet--.

Column 5; Line 43;   Please insert --50/50 of-- before silicone.

In the Claims

Column 8; Line 49; Claim 4;   Please insert --gas generant-- before retainer.

Column 8; Line 51; Claim 5;   Please insert --gas generant-- before retainer.

Column 8; Line 55; Claim 6;   Please insert --gas generant-- before retainer.

Signed and Sealed this
Eighteenth Day of August, 2015

Michelle K. Lee
*Director of the United States Patent and Trademark Office*